(12) United States Patent
Wang et al.

(10) Patent No.: US 11,372,970 B2
(45) Date of Patent: Jun. 28, 2022

(54) MULTI-DIMENSIONAL ATTESTATION

(71) Applicant: HEWLETT PACKARD ENTERPRISE DEVELOPMENT LP, Houston, TX (US)

(72) Inventors: Yongqi Wang, Bristol (GB); Ludovic Emmanuel Paul Noel Jacquin, Bristol (GB); Nigel Edwards, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 419 days.

(21) Appl. No.: 16/299,258

(22) Filed: Mar. 12, 2019

(65) Prior Publication Data
US 2020/0293652 A1    Sep. 17, 2020

(51) Int. Cl.
 G06F 21/00    (2013.01)
 G06F 21/55    (2013.01)

(52) U.S. Cl.
 CPC ...... *G06F 21/554* (2013.01); *G06F 2221/034* (2013.01); *G06F 2221/2149* (2013.01)

(58) Field of Classification Search
 CPC .............. G06F 21/554; G06F 2221/034; G06F 2221/2149
 USPC ........................................................ 726/23
 See application file for complete search history.

(56) References Cited

U.S. PATENT DOCUMENTS

| | | | |
|---|---|---|---|
| 7,752,465 B2 | 7/2010 | Ebringer et al. | |
| 9,307,411 B2 | 4/2016 | Ekberg | |
| 9,798,630 B2 * | 10/2017 | Cheriton | G06F 16/2365 |
| 9,813,233 B2 | 11/2017 | Wicker | |
| 10,530,753 B2 * | 1/2020 | Lie | H04L 9/3234 |
| 10,838,733 B2 * | 11/2020 | Gschwind | G06F 9/3863 |
| 2003/0226031 A1 * | 12/2003 | Proudler | G06F 21/62 726/16 |
| 2006/0100010 A1 * | 5/2006 | Gatto | G07F 17/3241 463/29 |
| 2009/0125716 A1 * | 5/2009 | Wooten | G06F 21/57 713/164 |
| 2009/0307487 A1 * | 12/2009 | Mowa | G06F 21/57 713/156 |
| 2013/0101117 A1 * | 4/2013 | Wicker | H04L 9/3218 380/255 |
| 2013/0218915 A1 * | 8/2013 | Billau | H04L 63/123 707/755 |

OTHER PUBLICATIONS

Imad M. Abbadi and Anbang Ruan, "Towards Trustworthy Resource Scheduling in Clouds," Jun. 2013, pp. 973-984, IEEE.

(Continued)

*Primary Examiner* — Josnel Jeudy
(74) *Attorney, Agent, or Firm* — Nolte Lackenbach Siegel

(57) ABSTRACT

Systems and methods for multi-dimensional attestation are provided. One method for multi-dimensional attestation includes upon occurrence of a triggering event, taking triggered measurements of a platform, the platform including a security co-processor and a volatile memory; extending a platform configuration register of the volatile memory to include the triggered measurements; taking snapshots of the platform configuration register over time; storing the snapshots in a snapshot memory; and upon request, sending the triggered measurements and the snapshots to a verifier for detection of potential attacks.

17 Claims, 5 Drawing Sheets

(56) References Cited

OTHER PUBLICATIONS

Wenjuan Xu et al., "Dr@ft: Efficient Remote Attestation Framework for Dynamic Systems," Sep. 2010, pp. 1-16.
Trusted Computing Group, "Trusted Platform Module Library Specification Part 1: Architecture", Sep. 29, 2016, Family "2.0", Level 00, Revision 01.38, TCG Published, 284 pages.
Trusted Computing Group, "Trusted Platform Module Library Specification Part 3: Commands", Sep. 29, 2016, Family "2.0", Level 00, Revision 01.38, TCG Published, 411 pages.

* cited by examiner

MULTI-DIMENSIONAL ATTESTATION

GOVERNMENT FUNDING

The project leading to this application has received funding from the European Union's Horizon 2020 research and innovation programme under grant agreement No 700199.

BACKGROUND

Components of computing systems communicate with each other over a computer network. These computing systems may be subject to cyberattacks by external entities that seek to access and/or harm such components. Computer security is designed to protect the computing system from potential damage resulting from such cyberattacks. Computer security may include devices, such as firewalls, passwords, keys, etc., designed to restrict access to the computer system. Computer security may also include devices, such as anti-spyware, screening software, antivirus software, etc., designed to detect cyberattacks.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

Figure 1:
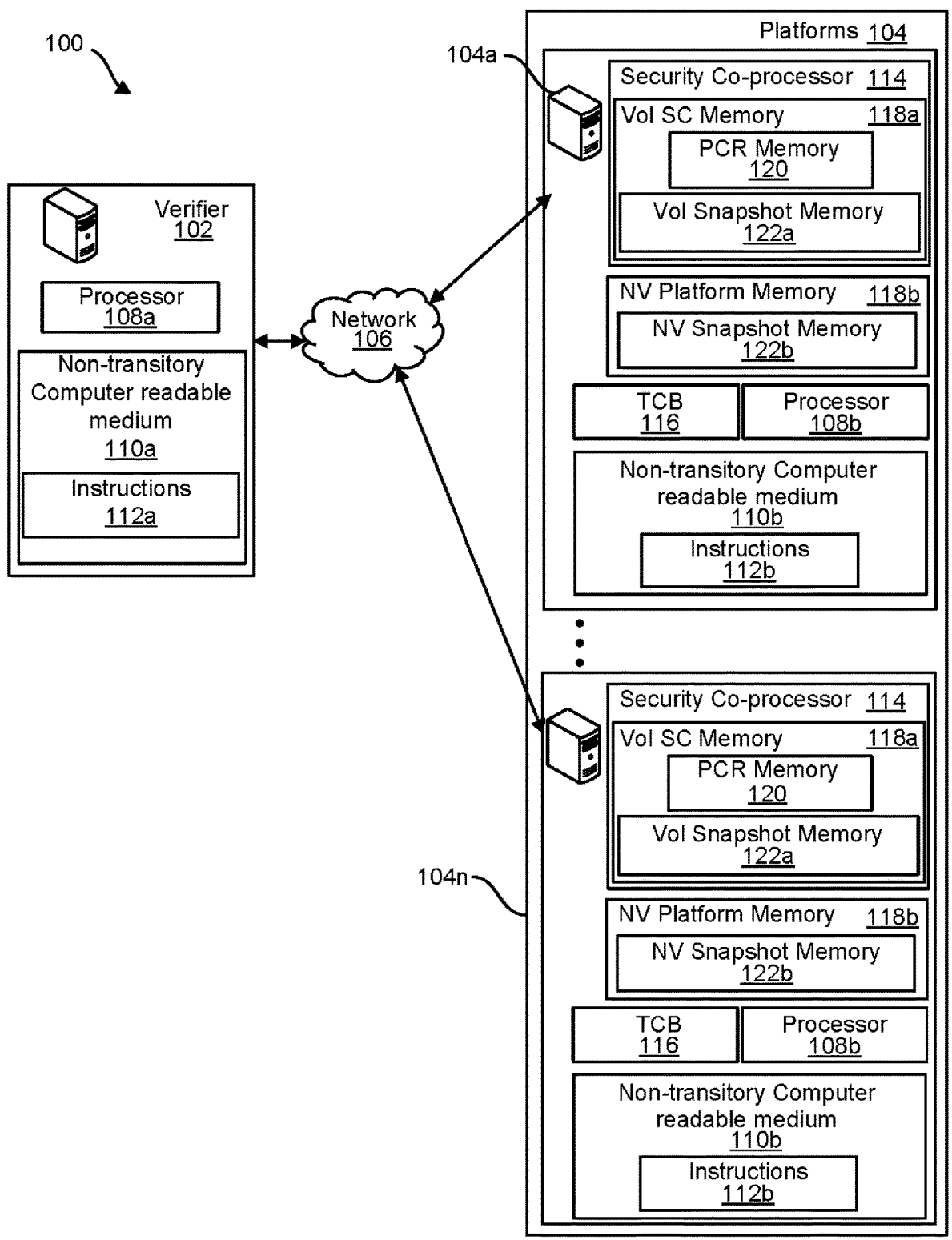
FIG. 1 depicts selected portions of a computing system for performing multi-dimensional attestation, according to one or more examples of the disclosure.

While examples described herein are susceptible to various modifications and alternative forms, the drawings illustrate specific examples herein described in detail by way of example. It should be understood, however, that the description herein of specific examples is not intended, to be limiting to the particular forms disclosed, but on the contrary, the intention is to cover all modifications, equivalents, and alternatives falling within the spirit and scope of the examples described herein and the appended claims.

DETAILED DESCRIPTION

Illustrative examples of the subject matter claimed below will now be disclosed. In the interest of clarity, not all features of an actual implementation are described in this specification. It will be appreciated that in the development of any such actual implementation, numerous implementation-specific decisions may be made to achieve the developers' specific goals, such as compliance with system-related and business-related constraints, which will vary from one implementation to another. Moreover, it will be appreciated that, such a development effort, even if complex and time-consuming, would be a routine undertaking for those of ordinary skill in the art having the benefit of this disclosure.

Example computing systems and methods disclosed herein seek to address security issues associated with cyber-attacks on computer devices. Computer security may be limited in its ability to monitor, detect, or prevent cyberattacks. Also, such, computer security may be unable to maintain sufficient detail to accurately identify cyberattacks. Existing techniques may monitor computer devices by sending successive attestations (communications) to the computer devices to collect measurements and to verify such devices are trustworthy. Intervals between such successive attestations may result in a delay in detection of, a potential cyberattack. Additionally, information provided during such successive communications may be limited by bandwidth capabilities, thereby limiting the available information presented with each of the successive communications. Until such time that sufficient information may be gathered to detect an attack, the computer device remains vulnerable. Such vulnerability may be magnified for systems with additional complexity, such as systems with multi-layered computer devices and/or multiple platforms.

The computing systems disclosed herein seek to provide attack identification, mitigation, and prevention by achieving a more detailed reporting from a platform, without increasing the frequency of attestations. The platform reports its condition in two-dimensions: time, and platform intermediate state. This multi-dimensional attestation seeks to enable a verifier to identify an attack, and to learn when the attack started and how it developed (i.e., to point to the origin of an attack and map its propagation through the network).

The disclosed computing system includes a verifier coupled to one or more platforms to retrieve measurements from such platform(s) and to detect potential threats to such platform(s). Each platform includes a security co-processor (e.g., a trusted platform module (TPM)) with a volatile (Vol) memory, a trusted computing base (TCB), and a non-volatile (NV) memory. This computing system allows the security co-processor to send logs of the measurements to the verifier. Unlike existing techniques that rely on measurements triggered by specific events, the disclosed computing system is capable of sending the triggered measurements, plus snapshots of the platform taken on an ongoing basis between such triggered measurements. Logs of these snapshots may be stored in a snapshot memory located: 1) in the Vol memory within the security co-processor, and/or 2) in the NV memory within the platform.

The verifier may trigger the platform to send logs of the triggered measurements and the snapshots for analysis, along with verifiable proof of the authenticity of such logs. The additional snapshots may be used to provide a more robust and continuous view of the platform(s) for analysis. A log of the snapshots may be used by the verifier to detect changes in the platform which may be used to pinpoint occurrence of a potential threat. Additionally, the triggered measurements and snapshots for multiple platforms may be analyzed by the verifier to enable comparisons between the platforms and/or reviews of historical performances, thereby providing a more expansive view of potential threats across a multi-level platform.

In some examples, methods are provided for multi-dimensional attestation. The method comprises upon occurrence of a triggering event, taking triggered measurements of a platform, the platform comprising a security co-processor and a volatile memory; extending a platform configuration register of the volatile memory to include the triggered measurements; taking snapshots of the platform configuration register over time; storing the snapshots in a snapshot memory; and upon request, sending the triggered measurements and the snapshots to a verifier. In some examples, a computing device is provided with a non-transitory machine-readable storage medium with instructions, that, when executed, causes a computing system to perform the method.

In some examples, a computing system is provided for multi-dimensional attestation. The computing system comprises a verifier; at least one platform coupled to the verifier and a computer-readable, non-transitory storage medium encoded with instructions that, when executed by a processor, cause the processor to perform the method. Each of the platforms comprises a trusted computing base; a non-volatile memory; and a security co-processor comprising a volatile memory. The volatile memory comprises a platform configuration register and a snapshot memory.

Turning now to the drawings, FIG. 1 depicts selected portions of a computing system 100 for performing multi-dimensional attestation, according to one or more examples of the disclosure. The computing system 100 includes various computing resources (e.g., servers, computers, microprocessors, and associated computing devices) coupled together by a network 106 over which these computing resources communicate. In the example shown, the computing resources include a verifier 102 and platforms 104.

The computing system 100, when invoked, performs a method of multi-dimensional attestation. In particular, the computing system 100 monitors performance of the platforms 104 to detect potential threats to the platforms 104, such as a cyberattack. "Cyberattack" or "attack" as used herein refers to attempts to expose, alter, disable, damage, destroy, steal, or access without authorization a computer device or data, such as the computing resources. Cyberattacks may involve hacking or other malicious activity that seeks to enter the computing device to collect information or harm the computer device.

The verifier 102 may include one or more computer resources for monitoring the platforms 104. Examples of devices used to monitor and/or verify components are described in U.S. Pat. Nos. 8,892,900 and 9,935,773, the entire contents of which are hereby incorporated by reference herein. In the example shown in FIG. 1, the verifier 102 includes a processor 108a and a non-transitory computer readable medium 110a used in performing the multi-dimensional attestation. The non-transitory computer readable medium 110a may be a variety of storage (computer readable) media accessible by the computing system 100 and/or the verifier 102 for performing instructions 112a associated with the multi-dimensional attestation.

As used herein, "computer readable medium" or "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a volatile (main) memory, such as RAM, where software may reside during runtime, and a secondary memory. The secondary memory can, for example, include a non-volatile memory where a copy of software or other data is stored.

The verifier 102 may be in communication with the platforms 104 via the network 106 for selectively performing the multi-dimensional attestation. The platforms 104 collectively refers to one or more individual platform 104a-104n. In the example shown in FIG. 1, the platforms 104a-104n are combined in a single platform architecture to perform separate or integral computer functions. The platforms 104a-104n may be defined in a single layer, or stacked into one or more multi-layers. The platform 104 includes 'n' number of identical platforms 104a-104n, but some versions may have identical and/or different platforms.

Each of the platforms 104a-104n may include one or more computer resources for performing computer tasks. The platforms 104a-104n may be independently operated and/or coupled together via computer links for performing various computer functions. The platforms 104a-104n may combine to form an architecture with one or more layers. A single layer of platforms may perform separate or integrated computer functions. For multiple layers of platforms, each layer of one or more platforms may act independently, or cooperate as a multi-layered platform. With a cooperative multi-layered platform, one layer of one or more platforms may act as a platform to one or more other layers to define an integrated, multi-layer platform configuration.

Each of the platforms 104a-104n includes a security co-processor 114, a trusted computing base (TCB) 116, and a non-volatile (NV) platform memory 118b. The security co-processors 114 may be in the form of a chip that resides on the platform (separate from the processor or central processing unit) and is used to store encryption keys, such as passwords, certificates, public keys, private keys, etc., for hardware authentication. The security co-processors 114 may be a crypto-processor (microprocessor) designed according to industry standards to provide hardware-based, security functions while also resisting tampering and malicious software. Example security co-processors that may be used include, for example, trusted platform modules (TPMs and/or TPM kits), or other firmware with the capabilities described herein. Examples of TPMs that may be used are commercially available from INFINEON TECHNOLOGIES® and NUVOTON®. Other examples of security processors include a firmware-based security co-processor, such as a TPM implemented in ARM TRUSTZONE® commercially available from ARM LIMITED® out of Cambridge, UK or INTEL® SGX commercially available from INTEL® out of Santa Clara, Calif., which can part of a main processor for the platform.

The TCB 116 is a combination of hardware and software used to take measurements of and to define security for the platform 104a-104n in which it resides. The TCB 116 may include a security kernel used to detect changes in its platform 104a-104n that may indicate a security threat. The TCB 116 may also include, for example, means for restricting access, safeguarding against malware, and backing up data. An example of a TCB that may be used includes a commercially available processor, such as an INTEL®, AMD® or other processor, in combination with a commercially available operating system, such as LINUX® or MICROSOFT® WINDOWS®.

The NV platform memory 118b is a computer memory that is capable of storing data over a period of time. As shown in FIG. 1, the NV platform memory 118b is located separate from and outside of the security co-processor 114. The NV platform memory 118b may be in the form of disc storage, memory chips, or other structure capable of retrieving stored information, even after power has cycled or shut off. Examples of the NV platform memory 118b that may be used are commercially available from various locations.

The security co-processor 114 is designed to store measurements of its corresponding platform 104a-104n. As shown by the example of FIG. 1, the security co-processor 114 may include a volatile (Vol) secure co-processor (SC) memory 118a used to collect and store measurements. The Vol SC memory 118a includes a platform configuration register (PCR) memory 120 and a Vol snapshot memory 122a. The Vol SC memory 118a is positioned within the security co-processor 114 separate from the NV platform memory 118b located outside of the security co-processor 114.

The PCR memory 120 is used to store the measurements taken by the TCB 116. In particular, the TCB 116 takes triggered measurements of its platform 104a-104n upon occurrence of an event. For example, after an operating system event (start of application), the TCB 116 takes the triggered measurement of the application. This triggered measurement may be stored as an extension of the PCR memory 120 using a PCR extend command. These triggered measurements include a sampling of both the application and the PCR memory 120, and may be in the form of code, data structures, configuration, information, or anything that can be loaded into the PCR memory 120. Logs of the measurements, including information about the PCR (list of PCR values) and information about the application, may be stored in the PCR memory 120 for access by the verifier 102.

The security co-processor 114 is also capable of taking additional measurements between the triggered measurements, referred to as snapshots. One or more of the snapshots may be taken according to a schedule, selectively upon command, and/or upon occurrence of an event. In contrast to the triggered measurements that extend (change) the PCR memory 120, the snapshots are copies of a current (intermediate) value of the PCR memory 120 and do not alter the PCR memory 120. These snapshots may be taken over time before, during and after the triggered measurements.

The snapshots may be converted into a hash for storage. The security co-processor 114 may take a current value of the PCR memory 120 and the triggered measurement to be extended, and hash such items together. Then, the security co-processor 114 replaces the content of the PCR memory 120 with the hash. The hash may be stored as logs in the PCR memory 120. Examples of the snapshots in the form of a hash of a Qi value of the PCR are described further herein with respect to Table 1. The snapshots may also be taken, hashed, and stored as logs in: 1) the Vol snapshot memory 122a within the Vol SC memory 118a of the security co-processor 114; and/or 2) in an NV snapshot memory 122b in the NV platform memory 118b in the corresponding platform 104a-104n. As used herein, a snapshot log is an ordered list of the snapshots taken at the different intervals. These snapshot logs include information about the PCR (e.g., a list of PCR values). These snapshot logs may be copied and stored in the Vol snapshot memory 122a or the NV snapshot memory 122b for access by the verifier 102.

The platforms 104a-n may also be provided with one or more processors 108b, and non-transitory computer readable mediums 110b with instructions 112b. The platforms 104a-104n may be configured to work with the processor 108a, the non-transitory computer readable medium 110a, and the instructions 112a of the verifier 102 to perform one or more functions associated with the multi-dimensional attestation. In particular, the processors 108b, the non-transitory computer readable mediums 110b, and the instructions 112b may be used to take, store, and send measurements to the verifier 102.

The verifier 102 may query one or more of the security co-processors 114 to check condition of the platform(s) 104a-104n. This query may activate the security co-processor 114 to send the triggered measurements and/or the snapshots to the verifier 102. The security co-processor 114 may secure the triggered measurements and snapshots signed with a private key, and then pass such secure triggered measurements, snapshots and the associated signature to the verifier 102. The verifier 102 may analyze the triggered measurements, the snapshots, the hash and/or the signature received. For example, for each platform, the verifier 102 may compare the hash with other measurements (or sequences of the measurements) to detect any differences which would indicate alteration or corruption of such platform, and thereby a potential cyberattack. The verifier 102 may also compare and cross-check the measurements received from multiple platforms 104a-104n. The verifier 102 may also verify the signature to validate the integrity of the triggered measurements and snapshots received, and to authenticate the platform using the public key associated with the private key from the security co-processor.

Figure 2:
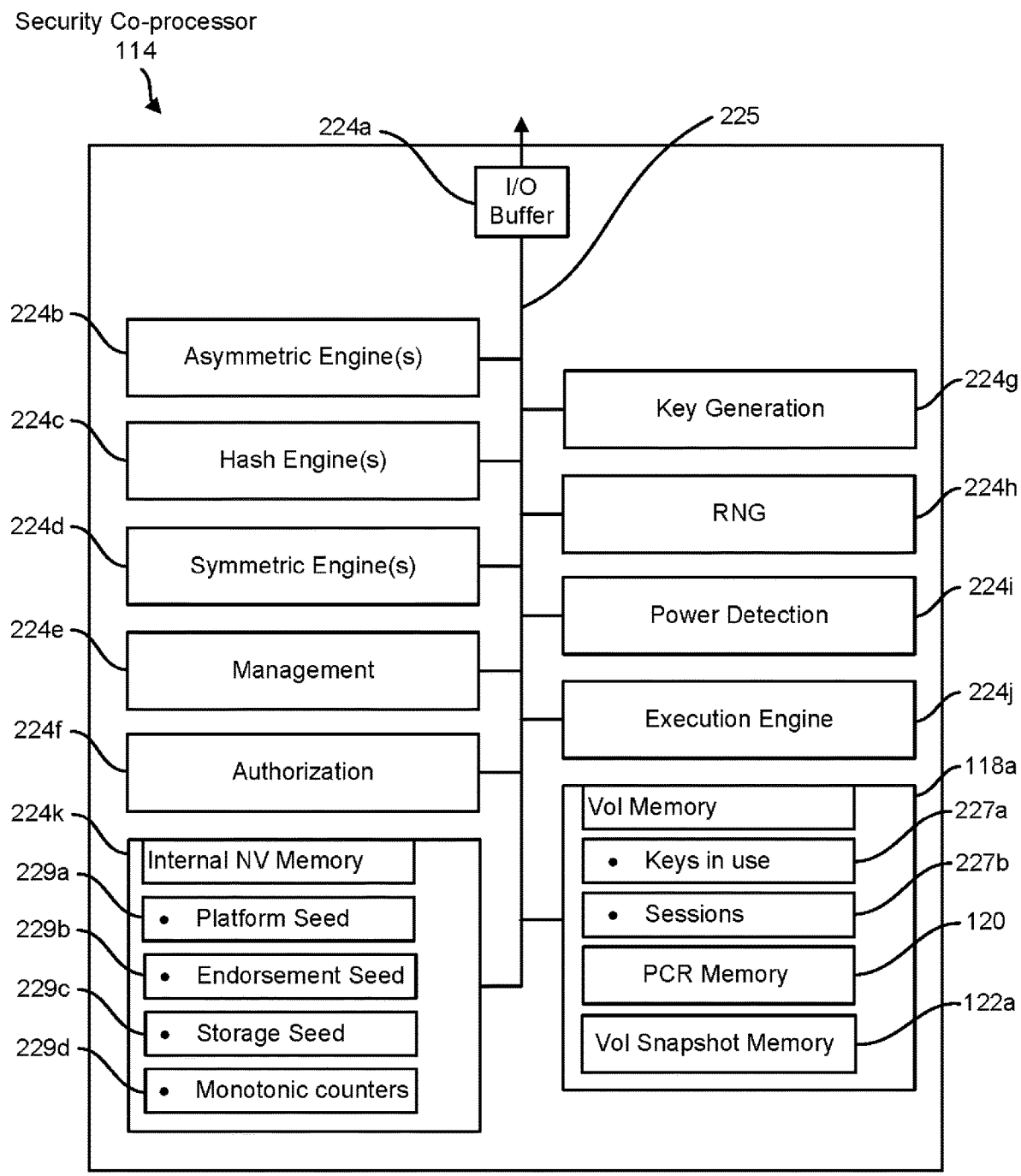
FIG. 2 is a block diagram of a security co-processor, according to one or more examples of the disclosure.

FIG. 2 is a block diagram of the security co-processor 114, according to one or more examples of the disclosure. As shown in this example, the security co-processor 114 may include various components, such as an input output (buffer) 224a for communication, asymmetric engine(s) 224b for encryption, hash engine(s) 224c for hashing the triggered measurements and the snapshots, symmetric engine(s) 224d for encryption, management 224e for administration, authorization 224f for access, key generation 224g for authentication, random number generator (RNG) 224h for generating random data, power detection 224i for enabling power, execution engine 224j for running program code, and the Vol SC memory 118a for short term storage. As shown by FIG. 2, the security co-processor 114 may be provided with an additional internal NV memory 224k for long term storage. The components 224a-k and the Vol memory SC 118a are connected by communication links as indicated by the lines 225.

As also shown in further detail in FIG. 2, the Vol SC memory 118a may include keys 227a (e.g., public keys and/or private keys) in use, sessions 227b, the PCR memory 120, and the Vol snapshot memory 122a. The internal NV memory 224k includes a platform seed 229a, an endorsement seed 229b, a storage seed 229c, and monotonic counters 229d. Data may be passed to and from the Vol SC memory 118a or the internal NV memory 224k in a protected form. A cached copy of the contents of the Vol SC memory 118a may be maintained in the internal NV memory 224k.

Figure 3:
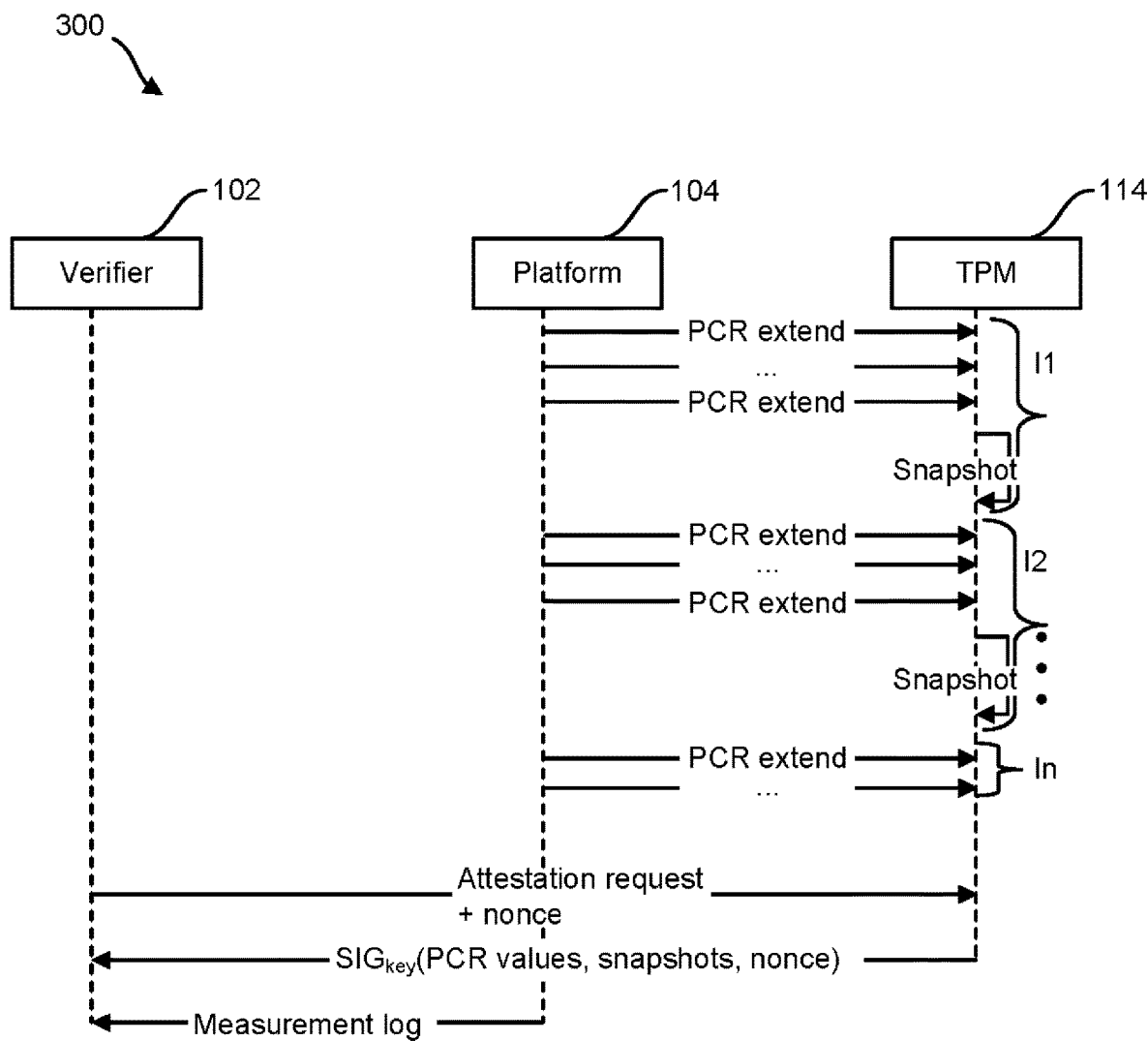
FIG. 3 is a schematic diagram depicting multi-dimensional attestation of the computing system using a non-volatile memory, according to one or more examples of the disclosure.
Figure 4:
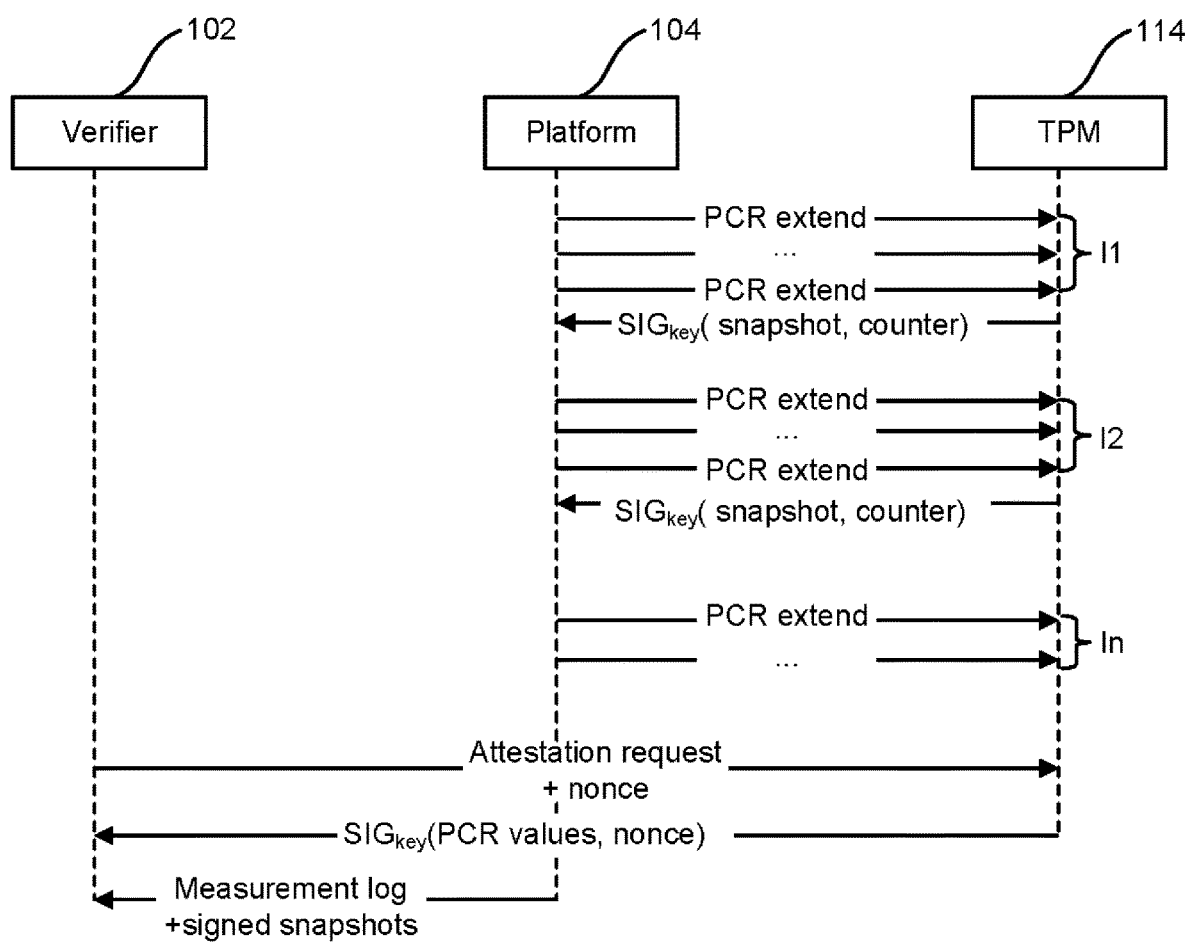
FIG. 4 is a schematic diagram depicting multi-dimensional attestation of the computing system using a volatile memory, according to one or more examples of the disclosure.

FIGS. 3 and 4 are schematic diagrams depicting multi-dimensional attestation of the computing system 100 using the Vol SC memory 118a and the NV platform memory 118b, respectively, according to one or more examples of the disclosure. FIG. 3 depicts an example method 300 of multi-dimensional attestation using the computing system 100 of FIGS. 1 and 2 with the Vol snapshot memory 122a of the Vol SC memory 118a. FIG. 4 depicts an example method 400 of multi-dimensional attestation using the computing system 100 of FIGS. 1 and 2 and the NV snapshot memory 122b of the NV platform memory 118b.

As shown in FIGS. 3 and 4, measurements are taken during intervals I1 to In. During interval I1, PCR extend commands cause the PCR memory 120 to extend to include the triggered measurements as they are taken. As indicated, one or more of the triggered measurements (PCR extend) may be taken during each of the measurement intervals I1-In. The intervals I1-In may occur following a trigger event, such as the start of an application as previously described. During such intervals I1-In, the snapshots of the PCR values may be taken and stored at the security co-processor (e.g., in Vol snapshot memory 122a-FIGS. 1 and 2). As shown in this example, there is a gap between the triggered measurements of intervals I1 and I2, and between intervals I2 and In. The snapshots may be taken during such gaps so that information concerning the platform 104 is more continuously available.

FIG. 3 shows an example implementation of multi-dimensional attestation. In this example, the triggered measurements stored in the PCR memory 120 and the snapshots stored in the Vol snapshot memory 122a within the security co-processor 114 may be sent to the verifier 102 upon request. The verifier 102 may send attestation requests to the security co-processor 114 to collect these stored triggered measurements and snapshots. As shown in FIG. 3, upon receipt of an attestation request+nonce, the stored triggered measurements and the snapshots ($Sig_{key}$ (PCR values, snapshots, nonce)) are sent back to the verifier 102 from the security co-processor 114. A corresponding measurement log may also be sent to the verifier 102 from the platform 104.

For existing TPM commands, a TPM2_Quote command returns to the verifier 102 a structure containing perDigest (a digest of current values in the PCR memory 120) and supporting data, plus a signature over the structure. The perDigest values may be used as the snapshots. To collect information about any time spent outside of the security co-processor 114, TPM2_Quote may be extended to allow the verifier 102 to specify a location in the Vol SC memory 118a (FIGS. 1 and 2) where the perDigest can be saved directly, and from which it can be retrieved at a later time. The TPM2_Quote may also be extended to allow the verifier 102 to request both the triggered measurement (PCR values) and the snapshots. With these extensions, the implementation of the multi-dimensional attestation can follow a similar course as the implementation of existing attestation.

Table 1 below shows an example report of a grid of measurement values taken using the multi-dimensional attestation of FIG. 3:

TABLE 1

GRID OF MEASUREMENT VALUES

| | Interval1 I1 | Interval2 I2 | Interval3 I3 | Interval4 I4 | Interval5 I5 | ... | ... |
|---|---|---|---|---|---|---|---|
| PCR1 | $V_{11}$ | $V_{12}$ | $V_{13}$ | $V_{14}$ | $V_{15}$ | ... | ... $P_1$ |
| PCR2 | $V_{21}$ | $V_{22}$ | $V_{23}$ | $V_{24}$ | $V_{25}$ | ... | ... $P_2$ |
| PCR3 | $V_{31}$ | $V_{32}$ | $V_{33}$ | $V_{34}$ | $V_{35}$ | ... | ... $P_3$ |
| PCR4 | $V_{41}$ | $V_{42}$ | $V_{43}$ | $V_{44}$ | $V_{45}$ | ... | ... $P_4$ |
| PCR5 | $V_{51}$ | $V_{52}$ | $V_{53}$ | $V_{54}$ | $V_{55}$ | ... | ... $P_5$ |
| ... | ... | ... | ... | ... | ... | ... | ... |
| | Q1 | Q2 | Q3 | Q4 | Q5 | ... | ... |

This table shows the values ($V_{ij}$) extended into the PCR memory 120 (PCR) for each measurement interval ($I_j$). The $P_i$ values are hashed measurements collected in the PCR memory 120 at the moment of attestation. The $Q_i$ values are hashed measurements collected in the PCR memory 120 for each interval.

Table 1 shows five (5) sets of the triggered measurements ($V_{ij}$) taken over five (5) intervals. The data may be converted to a hash as follows for delivery to the verifier 102:

$$Pi=\text{Hash}(\text{Hash}(\text{Hash}(\text{Hash}(0x00\|V_{i1})\|V_{i2})\|V_{i3})\\\|V_{i4})\|V_{i5}) \quad \text{Eq. (1)}$$

$$Qi \text{ minimally contains: Hash}(\text{Hash}(\text{Hash}(\text{Hash}\\(V_{1i}\|V_{2i})\|V_{3i})\|V_{4i})\|V_{5i}) \quad \text{Eq. (2)}$$

The data collected may be used by the verifier 102 to detect potential threats. The additional snapshots allow the verifier 102 to compare values over time. By comparing the values in Table 1 above, if the values remain consistent, then no action is required. However, if certain values, such as $P_2$ and $Q_4$ are found to be inconsistent with the measurement log, the verifier 102 is alerted that a cyberattack may have occurred between the third and fourth measurement intervals, in the part of the platform represented by PCR2. Upon detection of a potential threat, the verifier 102 may optionally send an alert or set off an alarm.

FIG. 4 shows another example implementation of multi-dimensional attestation. In this example, the snapshots are stored at the platform 104 (in the NV snapshot memory 122b in the NV platform memory 118b—FIGS. 1 and 2), and sent to the verifier 102 upon request. The verifier 102 may send attestation requests+nonce to the security co-processor 114 and the platform 104 to collect the triggered measurements stored in the PCR memory 120 and the snapshots stored at the platform 104. Upon receipt of an attestation request, the triggered measurements ($Sig_{key}$ (PCR values, nonce)) are sent to the verifier 102, and a corresponding measurement log+signed snapshots is sent to the verifier 102 from the platform 104.

For existing TPM commands, TPM's audit command may be used in place of TPM2_Quote to return to the verifier 102 the PCR memory value or a structure containing perDigest (a digest of current values in the PCR memory 120) and supporting data, plus a signature over the structure. The perDigest values may be used as snapshots. To collect information about any time spent outside of the TPM, TPM2_Quote may be extended to allow the verifier 102 to specify a location in the NV platform memory 118b (FIGS. 1 and 2) where the perDigest can be saved directly, along with the supporting data such as a counter and a signature over the structure, and from which it can be retrieved at a later time. The TPM2_Quote may also be extended to allow the verifier 102 to request both the triggered measurements (PCR values) and the snapshots.

In order to allow an audit of all commands which pertain to the changing of PCR values, various parameters can be included, such as TPM2_PCR_Extend, TPM2_PCR_Event, and TPM2_PCR_Reset. Thus, if the values from the audit registers are saved at the intervals, such values can also be used for the snapshots instead of the perDigest values from TPM2_Quote. For example, the audit commands TPM2_SetCommandCodeAuditStatus and TPM2_GetCommandAuditDigest can be used to audit each instance of PCR commands, regardless of which sessions are used, and/or the commands TPM2_StartAuthSession and TPM2_GetSessionAuditDigest may be used to audit PCR commands which are tagged to use a particular session. As with TPM2_Quote, some extensions to these audit commands may be used to implement two-dimensional attestation. These extensions are similar to those described for TPM2_Quote in FIG. 3.

Figure 5:
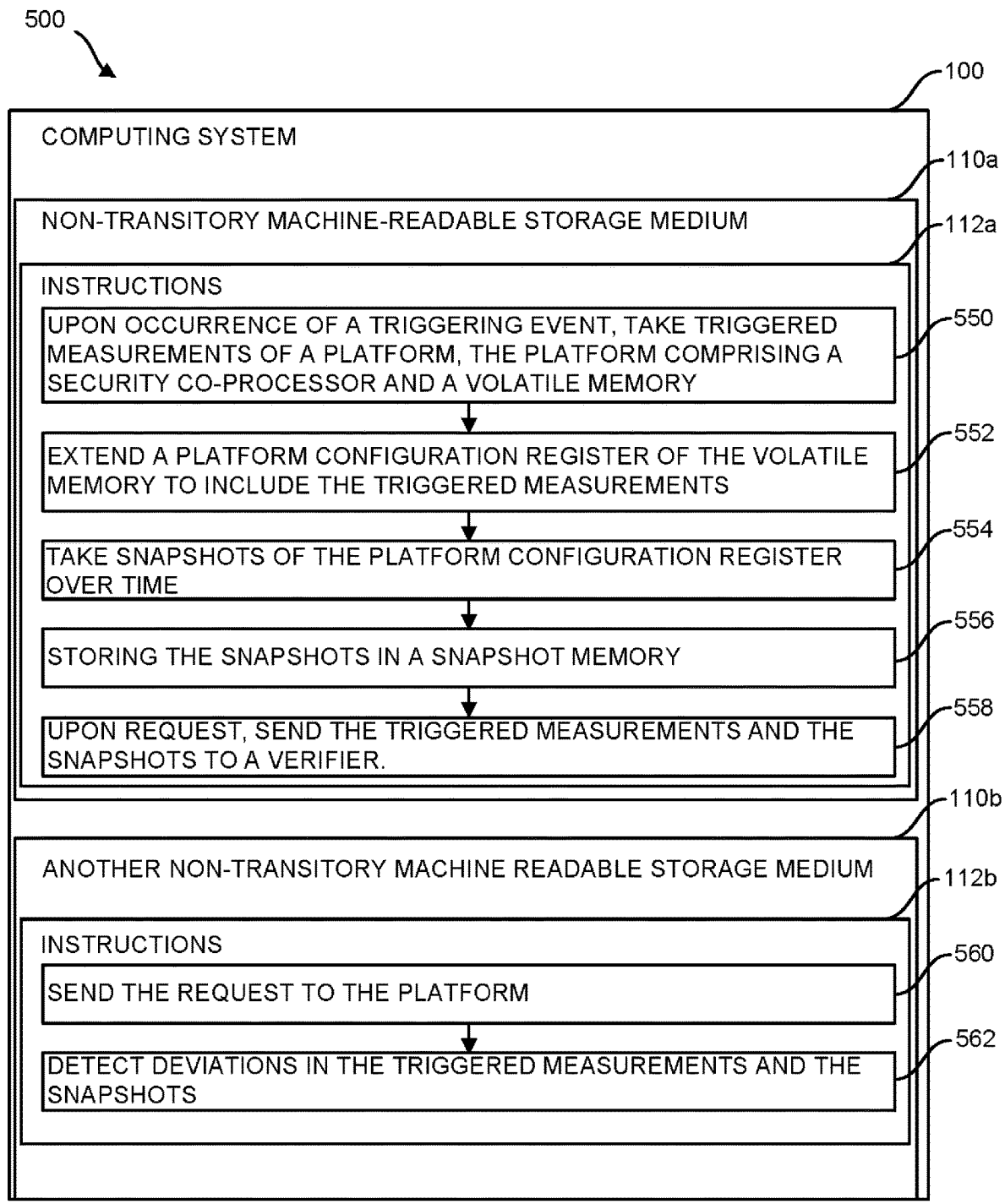
FIG. 5 is a computing device with a hardware processor and accessible machine-readable instructions that may be used to compile and execute a method for multi-dimensional attestation, according to one or more examples of the disclosure.

FIG. 5 is a computing device 100 with a hardware processor and accessible machine-readable instructions that may be used to compile and execute a method for multi-dimensional attestation, according to one or more examples of the disclosure. The method 500 may be implemented by a non-transitory machine-readable storage medium 110a. The non-transitory machine-readable storage medium 110a comprises instructions 112a, that, when executed cause a computing system, such as computing system 100 (FIGS. 1 and 2), to perform the method 500. The non-transitory machine-readable storage medium 110a may be located in or coupled to one of more of the platforms 104a-104n (FIG. 1).

As shown in FIG. 5, the method 500 includes upon occurrence of a triggering event, taking (550) triggered measurements of a platform, the platform comprising a security co-processor and a volatile memory; (552) extending a platform configuration register of the volatile memory to include the triggered measurements; (554) taking snapshots of the platform configuration registers over time; (558) storing the snapshots in a snapshot memory; and (556) upon request, send the triggered measurements and the snapshots to a verifier. The method 500 may be performed in any order and repeated as desired.

As also shown in FIG. 5, the method 500 may also be implemented by another non-transitory machine readable storage medium 110b. The non-transitory machine readable storage medium 110b may be provided to perform additional instructions 112b including (560). The non-transitory machine readable storage medium 110b comprises instructions 112b, that, when executed cause a computing system, such as computing system 100 (FIGS. 1 and 2), to perform an additional portion of the method 500 including (560) sending the request to the platform, and (562) detecting deviations in the triggered measurements and the snapshots. The non-transitory machine-readable storage medium 110b may be located in or coupled to the verifier 102 (FIG. 1).

As provided above, examples in the present disclosure may also be directed to a non-transitory computer-readable medium storing computer-executable instructions and executable by one or more processors of the computer via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific examples are presented for purposes of illustration and description. They are not intended to be exhaustive of or to limit this disclosure to the precise forms described. Obviously, many modifications and variations are possible in view of the above teachings. The examples are shown and described in order to best explain the principles of this disclosure and practical applications, to thereby enable others skilled in the art to best utilize this disclosure and various examples with various modifications as are suited to the particular use contemplated. It is intended that the scope of this disclosure be defined by the claims and their equivalents below.

What is claimed is:

1. A method for multi-dimensional attestation, comprising:
   in response to occurrence of triggering events, taking triggered measurements of a platform, the platform comprising a security co-processor and a volatile memory, wherein the triggered measurements are taken in respective time intervals, each time interval of the respective time intervals occurring following a corresponding triggering event of the triggering events, and wherein gaps are present between the time intervals;
   extending a platform configuration register of the volatile memory to include the triggered measurements;
   taking snapshots of the platform configuration register over time, wherein the snapshots are based on copies of values in the platform configuration register made during corresponding gaps of the gaps;
   storing the snapshots in a snapshot memory; and
   in response to a request, sending a representation of the triggered measurements and the snapshots to a verifier.

2. The method of claim 1, wherein the snapshot memory is included in the volatile memory in the security co-processor.

3. The method of claim 1, comprising storing a snapshot log of the snapshots in a non-volatile memory, the non-volatile memory being in the platform separate from the security co-processor.

4. The method of claim 1, further comprising:
   generating a hash of the triggered measurements and the snapshots; and
   adding the hash to the platform configuration register and the snapshot memory.

5. The method of claim 1, wherein the taking of the triggered measurements of the platform comprises taking a measurement of an application and a measurement of the platform configuration register.

6. The method of claim 1, wherein the taking of the snapshots of the platform configuration register over time comprises copying the platform configuration register.

7. The method of claim 1, further comprising:
   comparing the triggered measurements and the snapshots over time; and in response to detecting a deviation in the triggered measurements and the snapshots over time, sending an alert.

8. The method of claim 1, further comprising receiving the request at the security co-processor, the request comprising an attestation request that requests information relating to both the triggered measurements and the snapshots.

9. The method of claim 1, wherein storing the snapshots in the snapshot memory does not alter the platform configuration register.

10. A non-transitory computer-readable storage medium comprising instructions that, when executed, cause a platform to:
in response to occurrence of triggering events, take triggered measurements of the platform, the platform comprising a security co-processor and a volatile memory, wherein the triggered measurements are taken in respective time intervals, each time interval of the respective time intervals occurring following a corresponding triggering event of the triggering events, and wherein gaps are present between the time intervals;
extend a platform configuration register of the volatile memory to include the triggered measurements;
take snapshots of values in the platform configuration register over time, wherein the values in the platform configuration register represent the triggered measurements, wherein the snapshots are based on copies of values in the platform configuration register made during corresponding gaps of the gaps;
store the snapshots in a snapshot memory; and
in response to a request, send a representation of the triggered measurements and the snapshots to a verifier.

11. The non-transitory computer-readable storage medium of claim 10, wherein storing the snapshots in the snapshot memory does not alter the platform configuration register.

12. The non-transitory computer-readable storage medium of claim 10, wherein each of the triggered measurements comprises a measurement of an application and a measurement of the platform configuration register.

13. The non-transitory computer-readable storage medium of claim 10, wherein each of the snapshots comprises a hash based on a value in the platform configuration register.

14. A computing system comprising:
a verifier;
a platform coupled to the verifier, the platform comprising:
a trusted computing base;
a non-volatile memory;
a security co-processor comprising a volatile memory, the volatile memory comprising a platform configuration register and a snapshot memory; and
a non-transitory computer-readable storage medium comprising instructions that, when executed by a processor, cause the processor to:
in response to occurrence of triggering events, take triggered measurements of the platform, wherein the triggered measurements are taken in respective time intervals, each time interval of the respective time intervals occurring following a corresponding triggering event of the triggering events, and wherein gaps are present between the time intervals;
extend the platform configuration register of the volatile memory to include values representing the triggered measurements;
take snapshots based on copying the values in the platform configuration register over time, wherein the snapshots are based on copies of the values in the platform configuration register made during corresponding gaps of the gaps;
store the snapshots in the snapshot memory; and
in response to a request, send a representation of the triggered measurements and the snapshots to the verifier.

15. The computing system of claim 14, wherein storing the snapshots in the snapshot memory does not alter the platform configuration register.

16. The computing system of claim 14, wherein the verifier is to send the request to the platform to request the triggered measurements and the snapshots.

17. The computing system of claim 14, wherein the snapshots are based on a hash of the values in the platform configuration register.

* * * * *